Oct. 7, 1924.

W. J. MOORE

SAFETY FENDER

Filed Feb. 10, 1922

Walter J. Moore INVENTOR

BY Thomas Howe ATTORNEY

Oct. 7, 1924.

W. J. MOORE

SAFETY FENDER

Filed Feb. 10, 1922

Walter J. Moore INVENTOR

BY

Thomas Howe ATTORNEY

Oct. 7, 1924.

W. J. MOORE

1,511,038

SAFETY FENDER

Filed Feb. 10, 1922

Walter J. Moore INVENTOR

BY Thomas Howe ATTORNEY

Patented Oct. 7, 1924.

1,511,038

UNITED STATES PATENT OFFICE.

WALTER J. MOORE, OF NEW YORK, N. Y.

SAFETY FENDER.

Application filed February 10, 1922. Serial No. 535,472.

*To all whom it may concern:*

Be it known that I, WALTER J. MOORE, a citizen of the United States of America, residing at the city, county, and State of New York, have invented new and useful Improvements in Safety Fenders, of which the following is a specification.

This invention relates to devices which are especially intended to prevent persons struck by a vehicle from passing under the wheels thereof and so being seriously injured.

Where any considerable weight is involved in a fender and there is any movement particularly a bodily movement of the whole fender for any considerable distance, the inertia of the parts involves a lapse of time which, while small in itself, comes at such a time that it may make all the difference between saving a life and losing it. The fender should be automatic and come into operation when collision with a person requires it. To effect such operation to any purpose it is necessary that after a person is struck, in the extremely short time before he goes down and passes under the wheels the fender must operate. The lapse of even the very shortest interval will therefore be seen to be of the greatest importance.

It is the main object of the present invention to provide a fender which shall be so nearly instantaneous in operation as to reduce to a minimum, if not entirely avoid, failures of the fender to assume fending position in time to protect the person struck.

The collision bumper on the ordinary automobile usually strikes a pedestrian in the neighborhood of the knees. The result is that when struck the body of the person falls backwardly. If the fender controlling means is beneath the fender it is not operated until the person has fallen below the bumper and is on his way to the wheels. Furthermore if the person struck falls forward he naturally grasps for some support above the bumper to hold himself from passing beneath it.

It is a further object of the invention therefore to provide means above the bumper operated upon the striking of a person to throw the fender into fending position, and in order that the fender may be operated whether the person struck comes against its controlling means or pulls it forward for reasons as above indicated, it is a further object of the invention to provide fender controlling means operated by the person struck whether he pushes it backward or pulls it forward.

In numerous conditions met with in traffic the collision bumper may come against objects such as another vehicle, a post or a building and the collision bumper lessens the shock of impact and saves the vehicle from damage. There is, however, no necessity at such times for guarding against the passage of anything beneath the wheels of the vehicle and it would simply be a matter of annoyance to have the safety fender for preventing persons from passing under the wheels, operated whenever the vehicle collided with objects as indicated. To avoid such annoyance, it is a further object of the invention to provide fender controlling means which is not operated unless objects pass above or below the collision bumper. This will provide safety against running over persons struck but will avoid the annoyance referred to.

It has been observed that, particularly in the case of long trucks and when they pass around the corners of city streets close to the curb, there is danger of persons, particularly children, getting beneath the vehicle from the side between the front and rear wheels and passing under the rear wheels. To guard against this danger and similar conditions occasioned by a person getting under the vehicle to the rear of the front wheels in any manner whatever, it is a further object of the invention to provide a safety fender beneath the vehicle, forward of the rear wheels for preventing the passage of objects beneath the rear wheels.

A further object of the invention is to provide suitable signals for indicating the condition of the fender.

Other and ancillary objects of the invention will appear hereinafter.

In the accompanying drawings which illustrate the invention.

Referring to the drawings and first to Figs. 1 to 11 inclusive, an automobile having the usual chassis, front wheels 1, mud guards 2, radiator 3 and head lights 4, has secured to its chassis forward of the radiator etc., a bar 5 of U-shaped cross section opening toward the rear. Upon the forward side of this bar is a collision bumper formed of the metal strip 6 bent into an oblong figure as shown and having its back continuous and its ends overlapping at the front of the bumper, also a metal strip 7 formed in a similar shape to the figure of the strip 6 and located within the same so that its continuous side overlaps the ends of strip 6, these ends being secured to the strip 7 and to each other by the clips 8 while the ends of the strip 7 and the strip 6 are secured to the bar 5 by clips 9. The bumper as thus far described is adapted to receive collision impact as is the purpose of the ordinary bumper.

Figure 1:
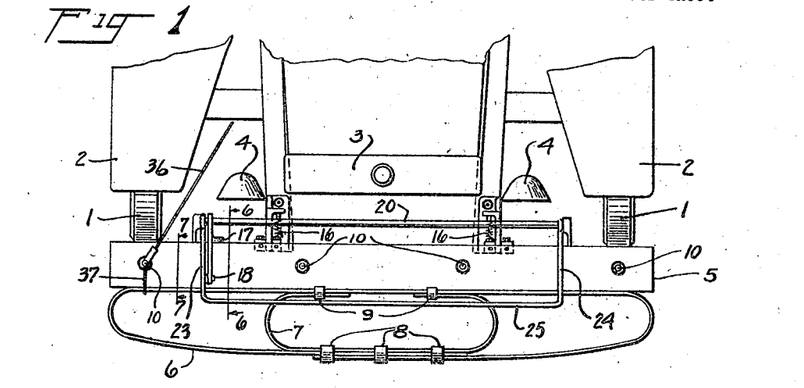
Fig. 1 is a top plan view of the front portion of an automobile equipped with the invention.
Figure 2:
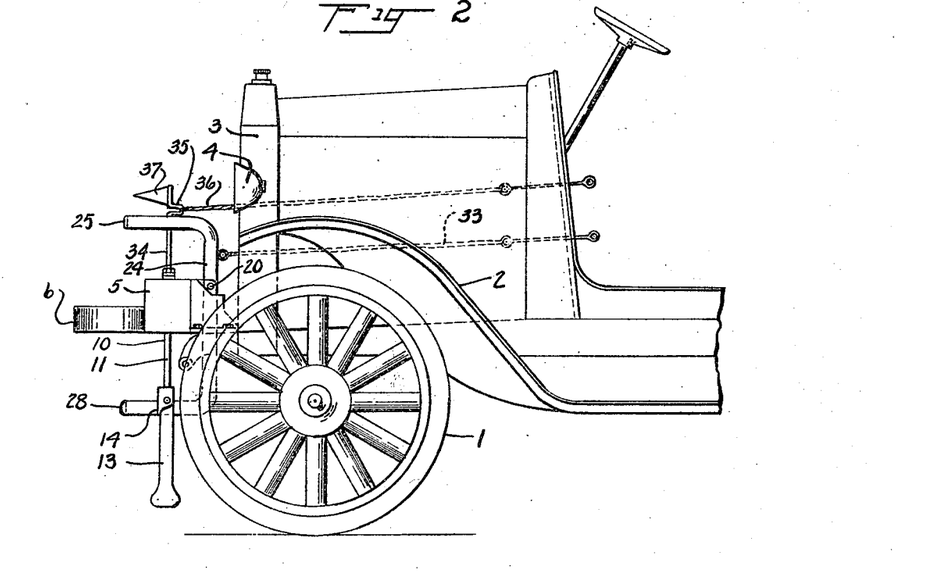
Fig. 2 is a side elevation of the apparatus of Fig. 1.
Figure 3:
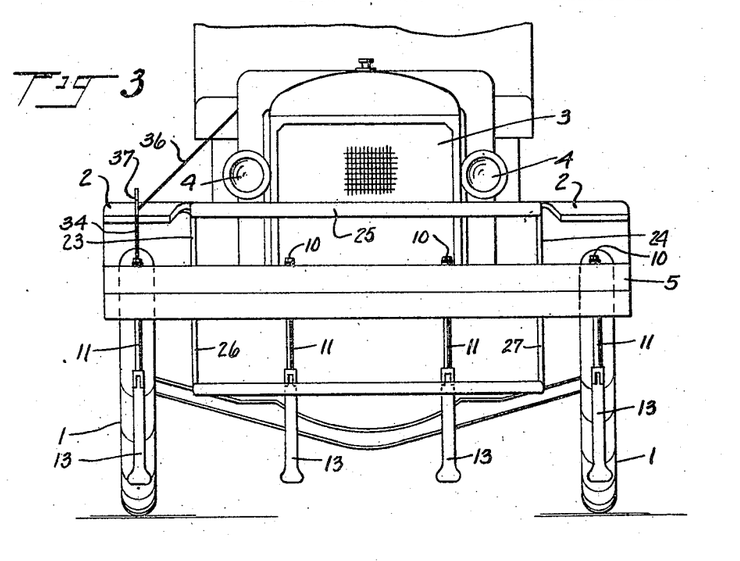
Fig. 3 is a front elevation of the apparatus of Figs. 1 and 2.
Figure 4:
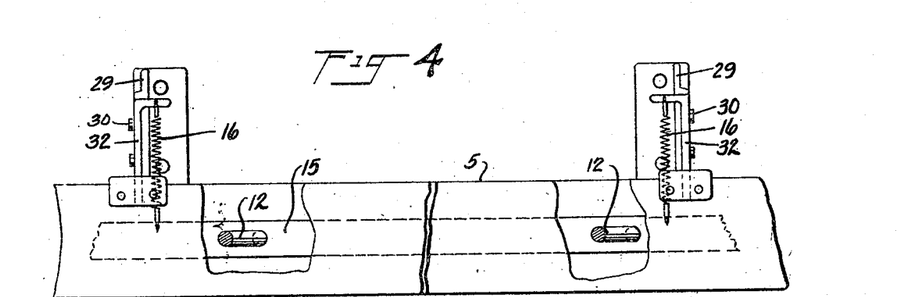
Fig. 4 is a top plan view, on an enlarged scale, of a portion of the fender partly broken away, showing the fender in non-fending position.
Figure 5:
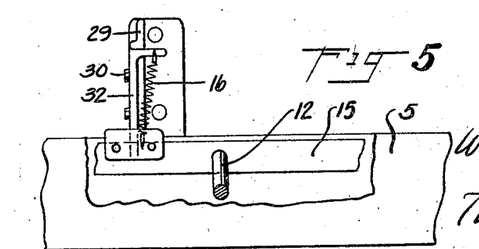
Fig. 5 is a view, broken away, of a portion of the apparatus of Fig. 4 showing the fending position of the apparatus.
Figure 6:
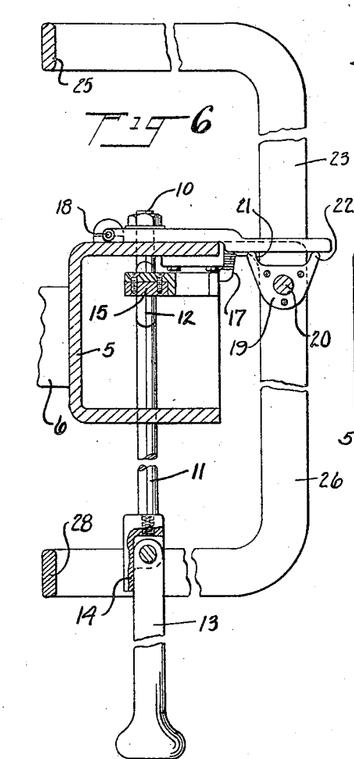
Fig. 6 is a section on an enlarged scale on the line 6—6 of Fig. 1.

To provide a safety fender for preventing persons struck from passing under the wheels, there is a plurality of vertical guard members 10 passing through the bar 5 from top to bottom and adapted to rotate therein. Each of these guard members comprises a shank 11 rotatably mounted in the bar 5 and having a crank 12 within the bar. Pivoted to the lower end of the shank is a finger 13 which extends to within a short distance of the ground so that there is no possibility that a person knocked down can pass beneath it to the wheels. In the normal condition they may move backwardly to permit the passage of bodies in the roadway, but on account of a projection 14 from the shank the portion 13 cannot swing forwardly so as to be forced endwise into a body with which it may come in contact. Also the lower ends of the fingers are rounded knobs so that sharp edges are not presented to objects with which they come in contact. Normally the pivotal axes between the shanks and fingers are transverse to the movement of the vehicle so that the movement of the fingers, as described, longitudinally of the vehicle can take place. When a person has been knocked down and it is desired to bring the guard members into operation to shield the person from the wheels, the pivotal axes referred to are shifted so as to extend parallel to the direction of movement of the vehicle so that the fingers cannot turn to allow the passage of the body. This is accomplished by apparatus now to be described:

Within the bar 5 is a connecting bar 15 connecting the cranks 12 of all the shanks so that they all turn together. Springs 16 tend to draw the bar 15 rearwardly into a position as shown in Fig. 5, but it is normally held from such movement by a latch 17 pivoted at 18 which holds the bar 15 and cranks 12 in the position as shown in Fig. 4. The latch 17 is adapted to be lifted out of the path of the bar 15 by a cam 19 fixed on the rock shaft 20 mounted in suitable bearings in projections from the bar 5. This cam has two ears 21 and 22, one of which raises the latch 17 for either direction of turning from the normal position as shown in Fig. 6. Two arms 23 and 24 are fixed to the shaft 20 and extend upwardly and forwardly, supporting at their forward ends the trip bar 25 which extends transversely across the front of the vehicle and above and to the rear of the front of the collision bumper 6. Also fixed to the shaft 20 and extending downwardly and forwardly therefrom are the arms 26 and 27 which at their forward ends support the trip bar 28 extending transversely across the vehicle, below the collision bumper and to the rear of the front of that bumper. It will be observed that a backward pressure on either of the trip bars will trip the latch 17 when the bar 15 and its connected cranks will be moved by the springs 16 from the position as shown in Fig. 4 to that shown in Fig. 5, so that the axes of the pivots between the shanks 11 and the fingers 13 will be moved from a position transverse to the vehicle to a position longitudinally of the vehicle. In this last position the guard members do not yield longitudinally of the vehicle so that they provide an effective guard against anything coming against them going under the front wheels. The lower trip bar when forced backwardly by an object coming against it, comes against the guard members and forms a connection between them so that all cooperate to resist the passage of the object under the wheels, and also aids in preventing the object from passing between the guard members. It will be observed that even if the guard members are set by the pushing backward of the upper trip bar, that then if the body tends to pass to the wheels it will come against the lower trip bar which will then be forced backwardly against the guard members as above referred to.

Figure 7:
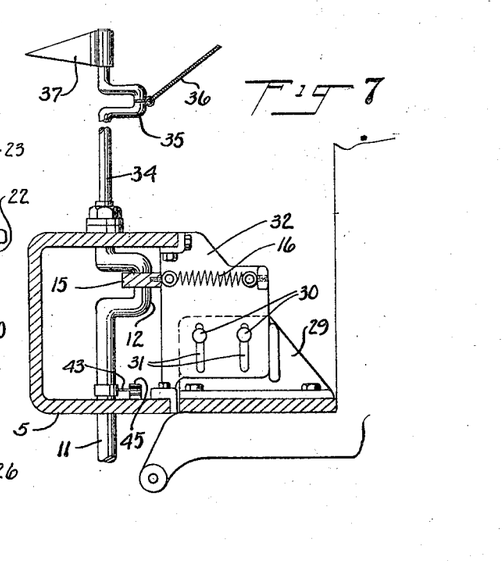
Fig. 7 is a section, on an enlarged scale, on the line 7—7 of Fig. 1.
Figure 8:
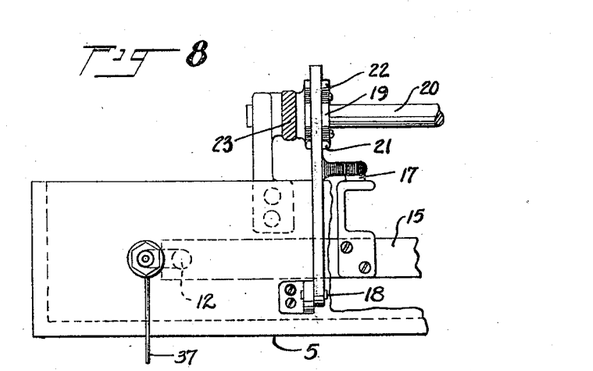
Fig. 8 is a top plan view, on an enlarged scale of the left hand end of the fender as shown in Fig. 1, the other parts being broken away.

In order that the fender apparatus may be raised and lowered to accommodate it to vehicles of different heights above the roadway, the bar 5 is mounted upon the chassis by means of adjustable supports provided by brackets 29 secured to the chassis through which extend bolts 30 which pass through slots 31 in Fig. 7 in plates 32 secured to the bar 5. By loosening the bolts the bar 5 may be raised and lowered and secured in the desired position by tightening the bolts.

To provide for setting the guard members in safety position at will, connection 33 secured to one of the trip bars or its supporting arms extends within the dash of the automobile where it can be conveniently reached by the chauffeur. A backward pull upon this device acts to pull the trip bar rearwardly as if it had come into collision with an object and so the guard members are set in safety position.

To provide for restoring the guard members to normal position after they have been set in safety position, and also to provide a signal to show the condition of the safety fender, one of the shanks 11 has an extension 34 above the bar 5 and has formed in it a crank 35 which normally stands longitudinally of the vehicle. At such times the cranks 12 stand transversely of the vehicle as shown in Fig. 4. On operation of the trip bar and setting of the guard members, the cranks 12 turn through 90° into a position where they extend longitudinally of the vehicle, while at such times the crank 35 will stand transversely of the vehicle. Under the latter conditions it will be seen that a pull on the cord 36 secured to the bight of the crank will turn all the cranks through 90° when the latch 17 will drop into position as shown in Fig. 6.

At the top of the projection 34 is fixed a metal banner 37 in plain sight of the chauffeur and which stands transverse of the vehicle when the guard members are set but normally extends longitudinally of the vehicle. The signal being of thin sheet metal, when it stands longitudinally of the vehicle it is practically invisible and when it stands transversely of the vehicle there is an unescapable indication that the guard members are set.

Figures 9, 11, 19, 20:
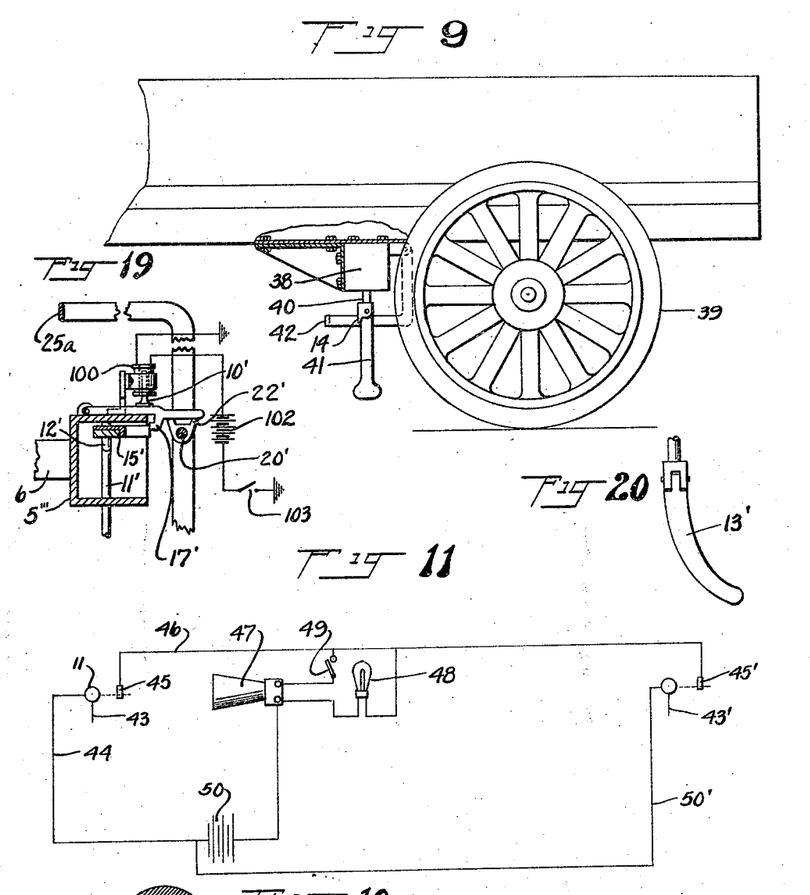
Fig. 9 is a side elevation of a vehicle partly in section showing the rear end thereof.
Fig. 11 is a diagram of the electrical connections for the signal circuits controlled by the fender.
Fig. 19 is a sectional view similar to Fig. 6 but on a smaller scale and fragmentary showing the application of an electro-magnet control to the safety fender.
Fig. 20 is a fragmentary view showing a modification of a safety finger or member.
Figure 10:
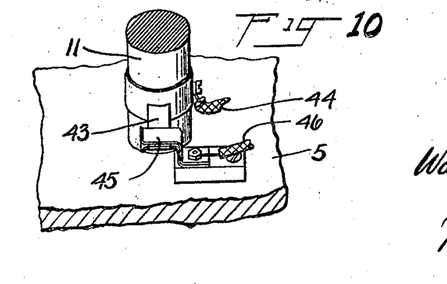
Fig. 10 is a perspective view showing the manner of applying signal controlling contacts to the fender.

It has been observed that there is considerable danger of persons, especially children, getting under trucks between the front and hind wheels so that they are injured by the hind wheels and of course the guard in front of the front wheels would afford no protection in such cases. To prevent this, and to prevent objects that may come back to the rear wheels, from passing under the hind wheels, a similar guard is mounted beneath the vehicle in front of the hind wheels as shown in Fig. 9. Thus a bar 38, the same as the bar 5, is secured to the chassis in front of the hind wheels 39. Rotatably mounted in the bar 38 are the guard members each comprising a shank 40 and finger 41, the same as the guard members already described in connection with the front wheels of the vehicle. There is no necessity or room for an upper trip bar and consequently only a lower trip bar 42 is provided which acts to permit the operation of the guard members when it is pushed backwardly precisely as in the case of the lower trip bar for the front wheels.

It is desirable to indicate to the operator of the car when a person or object has been struck so as to cause the operation of the guard. To this end a switch blade 43 is mounted on one of the shanks 11 and to this blade is connected a conductor 44 of a signal circuit to be shortly described. Adapted to cooperate with the switch blade 43 are clips 45 mounted in an insulated manner and having connected to them the circuit conductor 46 of the signal circuit. When the guard or fender is in normal position the blade 43 is removed from the clips 45 as indicated in Fig. 11. When, however, the fender is tripped or set the shank 11 turns and brings the blade 43 into engagement with the clips 45 thereby establishing electrical connection between the conductors 44 and 46 of the signal circuit. The signals may comprise an electrically operated horn 47 and an electric light 48 mounted in some convenient position for observation. The horn may be cut in or out by means of a switch 49 and current is supplied for the signals by a battery 50. It will now be seen that when the fender is tripped into safety position, the conductors 44 and 46 are connected together, and circuit may be traced from one terminal of the battery 50 through the conductor 44, switch plate 43, switch clips 45, conductor 46 and lamp 48 to the other terminal of the battery. The lamp will thus always be lighted whenever the fender is in safety position and will be extinguished at other times. If the switch 49 is closed circuit will also be made in parallel with the lamp 48 through the horn so that in addition to the lighting of the lamp the sounding of the horn will indicate that the fender has been tripped into a safety position. At such times when it is desired that the horn shall not sound but that the lamp only shall indicate tripping of the fender, the switch 49 may be left open.

The signals may also announce the operation of the fender for the rear wheels by providing upon a shank of one of its guard members switch plates and clips 43' and 45' in precisely the same way that such apparatus is provided upon the shanks 11 of the front wheel fender. It will be seen from the diagram of Fig. 11 that the clip 45' is connected with the conductor 46 while the plate 43' is connected by a conductor 50' with one terminal of the battery. It will further be seen that upon the engagement of the plate 43' with the clip 45' when the rear fender is operated circuit will be closed through the battery and lamp 48 and also (if the switch 49 is closed) through the horn 47 in parallel with the lamp. It now appears that the signal lamp 48 will be lighted and the horn 47 sounded or not according to whether or not the switch 49 is closed whenever either or both of the front and rear fenders are operated.

Figure 12:
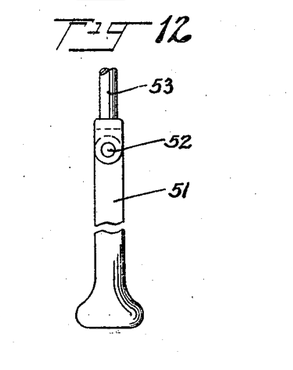
Fig. 12 is a side elevation, partly broken away, of a modified form of guard member.

In Fig. 12 is shown a modified form of guard member which may be employed if desired, from which the projection 14 has been omitted leaving the finger 51 free to swing in either direction about its pivot 52 whereby it is joined to the shank 53.

Figure 13:
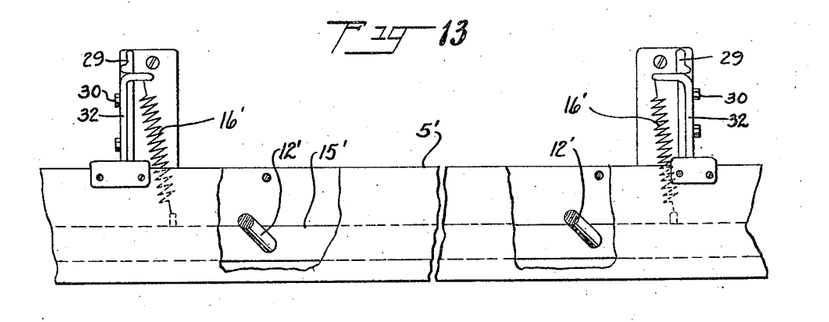
Fig. 13 is a top plan view similar to Fig. 4, showing a modified arrangement of the guard members with the apparatus in non-fending position.
Figures 14, 15, 17, 18:
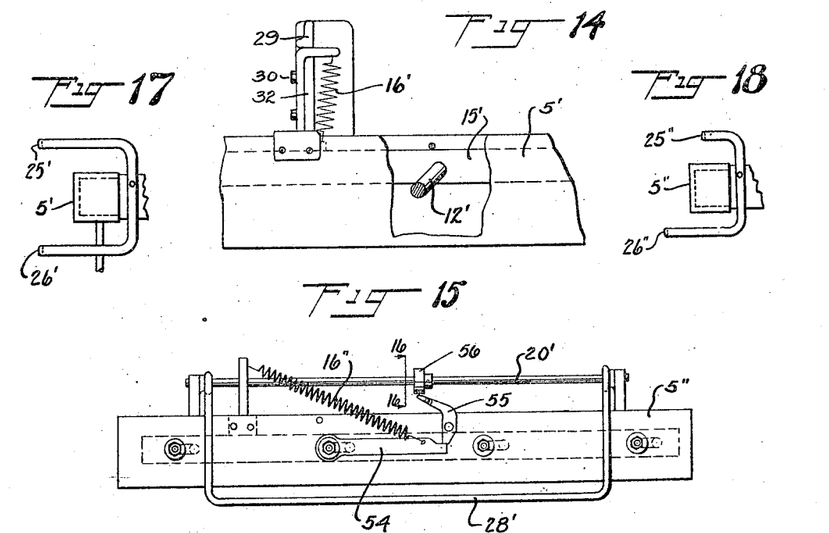
Fig. 14 is a view of a portion of the apparatus shown in Fig. 13 but showing the fender in fending position.
Fig. 15 is a top plan view of a modified form of fender controlling and operating means.
Figs. 17 and 18 are fragmentary views showing modified arrangements of trip bars.
Figure 16:
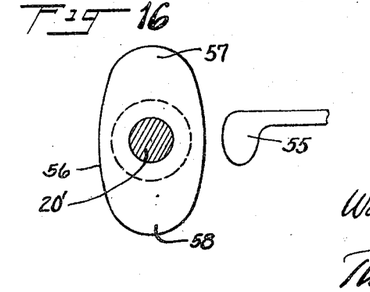
Fig. 16 is a section on an enlarged scale on the line 16—16 of Fig. 15.

Figs. 13 and 14 show a modification wherein the guard members and other supporting and operating means are so assembled that instead of the crank members on the shanks normally standing transverse to the vehicle and tripping into a position longitudinally of the vehicle, the cranks are caused to occupy positions such that they never come to a dead center with relation to other operating means. Thus in Fig. 13 are shown the cranks 12' occupying positions at 45° to the axis of their connecting bar 15', this being the normal position in which the bar is held by a latch as previously described against the tension of spring 16'. When the latch is tripped the cranks move through 90° under the influence of its springs into a position as shown in Fig. 14, this being 90° removed from the position as shown in Fig. 13 and it will be observed that at no time do the cranks stand in line with the direction of pull on the bar 5 so that there is always an operative lever arm upon the shanks 14 and with no possibility of dead centers thus contributing to the ease and certainty of operation of the apparatus.

In the modifications above referred to, the operating springs exert a direct pull upon the bar connecting the cranks. In order to multiply the power of the spring in acting upon the cranks, an arm 54 in Fig. 15 may be fixed upon one of the shanks of the guard members and an operating spring 16'' secured thereto so as to have a considerable leverage in acting to move the connected cranks. Normally this arm is prevented from movement and the cranks and guard members held in their normal position by means of a pivoted dog 55 connected with the end of the arm 54. This dog is thrown out of engagement with the arm 54 by means of a cam 56 upon the rock shaft 20' which also has fixed to it an upper trip bar 25' and a lower trip bar precisely the same as in Fig. 6. When either of these trip bars is pressed backwardly the bar is rocked and either the projection 57 or the projection 58 is thrown against the tail of the dog 55 which is thus thrown out of engagement with the arm 54 and the fender moved into set safety position by the spring 16''.

It is believed that the operation of the apparatus will be thoroughly understood from the foregoing description. It may be pointed out, however, that if a person is struck by the vehicle he will be first hit by the bumper 6 which will usually cause him to fall toward the radiator and thus come against the upper trip bar. This will set the fender in operation so that if he falls down and tends to pass beneath the wheels the fender will be set to prevent it. If in falling he should catch the upper trip bar this also would have the effect of throwing the fender into safety position, because it will be observed that the fender is set by rocking the cam shaft in either direction from normal so that the fender is set in safety position by pushing either trip bar backward or pulling it forward. It is therefore impossible to strike any one and not have the fender set in safety position.

It will further be seen that the collision bumper is forward of the safety trip so that in any collisions against objects such as running into another vehicle or a post or the like, the safety fender will not be set. It will only be set when it strikes an object such as a person which can pass backwardly above or below the collision bumper that the safety fender will be operated. This is of practical advantage in the operation of the car as the safety fender is useful to save the lives of persons struck, and it would be futile and productive of annoyance and inconvenience for it to be operated whenever there was a slight bumping against inanimate objects as referred to.

It will further be observed that the safety fender is certain of operation when the time arrives and on account of the fact that there is scarcely any movement of parts but simply a setting of the parts in the safety position, the safety setting of the fender from normal is almost instantaneous so that its efficiency in saving life is increased many fold.

In Fig. 17 the U-bar 5′ similar to that shown in Fig. 6 is not provided with a bumper as 6 in that figure and consequently the trip bars 25′ and 26′ are in advance of the collision bumper in this case formed by the bar 5′. This construction may be advantageous under some conditions.

Fig. 18 shows a construction similar to that of Fig. 17 but wherein one of the trip bars 25′ is to the rear of the bumper bar 5″, whereas the trip bar 26″ is forward of the collision bumper.

In Fig. 19 the U-bar 5‴ has the operating bar 15′ similar to the bar 15 in Fig. 6 operating upon the cranks 12′ of the shanks 11 or of the guard members. This bar 15 is held in normal position by a pivoted latch 17′ adapted to be lifted to permit the throwing of the safety fender into operation by means of a cam 22′ upon the rock shaft 20′ which is operated by the trip bar 25ª, the apparatus thus far described being the same as that shown in Fig. 6. In order to provide for the throwing into operation of the fender when desired electrically, the electromagnet 100 is mounted upon the bar 5‴ and has a plunger 101 secured to the latch 17′. When this magnet is energized the latch is lifted and the fender thrown into operation under the influence of a spring as described in connection with the apparatus of Fig. 6. The magnet 100 is connected in circuit with any suitable source of electricity such as battery 102, the circuit through the magnet and battery being controlled by means of a suitable switch 103 which may be a push button located in convenient reach of the operator. This electrical tripping means provides a convenient device for operating the fender in front of the rear wheels as the location of that fender is such that it cannot readily be reached by mechanical connections. However, the apparatus may be useful in various other connections.

As regards Fig. 20, this shows a modified form of guard member wherein a swinging finger 13″ is bent in such direction that its lower end extends forwardly in the direction of the vehicle when the fender is in fending position, that is when the pivot of the finger is extending longitudinally of the vehicle. When in normal or non-fending position the plane of curvature of the finger extends transversely of the vehicle. A finger of this form has a sort of scooping effect on coming in contact with a person struck by the vehicle so that he is more readily carried along without injury if the vehicle should not be stopped immediately.

While the invention has been illustrated in what are considered its best applications it may have other embodiments without departing from its spirit and is not therefore, limited to the structures shown in the drawings.

What I claim is:

1. The combination with a vehicle, of a safety fender thereon adapted to prevent objects from passing beneath wheels of the vehicle comprising means normally yielding to permit the vehicle to pass over objects in its path and means for rendering said yielding means unyielding to prevent objects in the roadway from passing beneath the vehicle.

2. The combination with a vehicle, of a safety fender thereon adapted to prevent objects from passing beneath wheels of the vehicle, said fender being mounted in fixed position of elevation with relation to the vehicle and having normal and fending conditions, and means for changing said fender from normal to fending condition.

3. The combination with a vehicle, of a safety fender thereon adapted to prevent objects from passing beneath wheels of the vehicle and comprising a pivoted guard member adapted to be moved from a position where the axis of the pivot is transverse to the vehicle to a position where said axis is longitudinal of the vehicle.

4. The combination with a vehicle, of a safety fender thereon adapted to prevent objects from passing beneath wheels of the vehicle and comprising a pivoted guard member adapted to be moved from a position where the axis of the pivot is transverse to the vehicle to a position where said axis is longitudinal of the vehicle and means for preventing movement of said guard member in one direction about its pivot.

5. The combination with a vehicle, of a safety fender thereon adapted to prevent objects from passing beneath wheels of the vehicle and comprising a plurality of pivoted guard members adapted to be moved from a position where the axes of the pivots are transverse to the vehicle to a position where said axes are longitudinal of the vehicle and means for connecting said guard members together whereby they are simultaneously moved from one of said positions to the other.

6. The combination with a vehicle, of a safety fender thereon adapted to prevent objects from passing beneath wheels of the vehicle and comprising a U-shaped bar and a plurality of guard members rotatably mounted therein each comprising a shank including a crank and a finger pivoted to said shank member, means for connecting the cranks of said guard members whereby they are rotated simultaneously and means for rotating said guard members.

7. The combination with a vehicle, of a safety fender thereon adapted to prevent objects from passing beneath wheels of the vehicle comprising means normally yielding to permit the vehicle to pass over objects in its path, means for rendering said yielding means unyielding to prevent objects in the roadway from passing beneath the vehicle and means adapted to be operated by a force acting longitudinally of the vehicle for throwing said fender into unyielding condition.

8. The combination with a vehicle, of a safety fender thereon adapted to prevent objects from passing beneath wheels of the vehicle comprising means normally yielding to permit the vehicle to pass over objects in its path but biased to an unyielding position, means for holding said fender in yielding position and tripping means adapted to be operated by a force exerted longitudinally of the vehicle for controlling said holding means.

9. The combination with a vehicle, of a safety fender thereon adapted to prevent objects from passing beneath wheels of the vehicle, adapted to be moved from non-fending to fending position, means adapted to be actuated by a force exerted longitudinally of the vehicle for controlling said fender and a collision bumper forward of said controlling means.

10. The combination with a vehicle, of a safety fender thereon adapted to prevent objects from passing beneath wheels of the vehicle, comprising fending parts normally in non-fending position but biased to a fending position, and means for holding said fending parts in non-fending position, a trip bar for controlling said holding means and a collision bumper forward of said trip bar.

11. The combination with a vehicle, of a safety fender thereon adapted to prevent objects from passing beneath wheels of the vehicle, comprising fending parts normally in non-fending position but biased to a fending position, and means for holding said fending parts in non-fending position, a trip bar for controlling said holding means and a collision bumper forward of said trip bar, said trip bar being above said bumper.

12. The combination with a vehicle, of a safety fender thereon adapted to prevent objects from passing beneath wheels of the vehicle, comprising fending parts normally in non-fending position but biased to a fending position, and means for holding said fending parts in non-fending position, a trip bar for controlling said holding means and a collision bumper forward of said trip bar, said trip bar being below said bumper.

13. The combination with a vehicle, of a safety fender thereon adapted to prevent objects from passing beneath wheels of the vehicle, comprising fending parts normally in non-fending position but biased to a fending position, and means for holding said fending parts in non-fending position, trip bars for controlling said holding means and a collision bumper forward of said trip bars and said trip bars being above and below said bumper.

14. The combination with a vehicle having forward and rear wheels, of a fender beneath the vehicle forward of the rear wheels and rearward of the forward wheels, comprising pivoted fending members normally yielding to permit passage of objects on the roadway and normally having their pivotal axes transverse of the vehicle, said members being rotatable into an unyielding position and having their pivotal axes longitudinally of the vehicle.

15. The combination with a vehicle, of a collision bumper thereon and a safety fender comprising a bar, a plurality of guard members rotatably mounted therein, each of said guard members comprising a shank and a finger pivoted thereto, each of said shanks including a crank and means for connecting the cranks together so that all of the cranks are simultaneously operated, the axes of the said pivots normally standing transverse to said vehicle, means tending to rotate said cranks to bring said axes longitudinally of the vehicle, a latch for holding said guard members in normal position, a rock shaft, a cam on said rock shaft adapted to trip said latch when said shaft is rocked in either direction and trip bars fixed to said shaft and located at the rear of the forward end of said bumper and above and below the same.

16. A collision bumper for automobiles comprising a band bent upon itself to bring its ends adjacent each other and a second band bent to bring its ends adjacent each other, said second band being within the first mentioned band, the ends of the first mentioned band being overlapped by a continuous portion of the said second band and the ends of said second band being overlapped by a continuous portion of the said first mentioned band and means for securing said bands together.

17. The combination with a vehicle, of a safety fender thereon having fending and non-fending positions, means for biasing said fender to fending position, means for holding said fender in non-fending position and electrical means for controlling said last mentioned means.

18. The combination with a vehicle, of a fender thereon having fending and non-fending positions comprising freely swinging fending fingers.

19. The combination with a vehicle, of a fender thereon having fending and non-fending positions and having fending fingers with movement limited in one direction of swinging.

20. The combination with a vehicle, of a safety fender thereon having fending and non-fending positions and trip rods controlling said fender, one being forward and the other to the rear of the collision bumper.

21. The combination with a vehicle, of a safety fender thereon comprising rotatable fending or guard members having cranks and a member connecting said cranks for operating said guard members, the planes of said cranks being at angles to a line longitudinal of the vehicle in both the non-fending and fending positions of said guard member.

22. The combination with a vehicle, of a safety fender thereon having fending and non-fending positions, a collision bumper and trip bars controlling said fender located above and below said collision bumper.

23. The combination with a vehicle, of a fender thereon having fending and non-fending positions comprising freely swinging fending fingers, a collision bumper and a trip bar controlling said fender located forward of said bumper.

24. The combination with a vehicle, of a fender thereon having fending and non-fending positions comprising freely swinging fending fingers, a collision bumper and trip rods controlling said fender, one of said rods being forward of said bumper and another of said rods to the rear of said bumper.

25. The combination with a vehicle, of a fender thereon having fending and non-fending positions comprising yielding fingers bent at their lower positions so as to extend forward when in the fending position so as to at least partially support a body coming against it.

In testimony whereof I have signed this specification this 2nd day of February, 1922.

WALTER J. MOORE.